United States Patent [19]
Cleare

[11] 3,791,680
[45] Feb. 12, 1974

[54] END FITTINGS FOR FLEXIBLE METALLIC CONDUITS

[75] Inventor: Ian Martin Cleare, Wycombe, England

[73] Assignee: Smiths Industries Limited, London, England

[22] Filed: June 28, 1972

[21] Appl. No.: 266,874

[30]   Foreign Application Priority Data
  July 2, 1971   Great Britain.................. 31059/71

[52] U.S. Cl................. 285/174, 285/110, 285/248, 285/251, 285/259
[51] Int. Cl............................................ F16l 33/22
[58] Field of Search... 285/245, 247, 248, 246, 256, 285/259, 110, 174, 251

[56]    References Cited
    UNITED STATES PATENTS
  609,383   8/1898   Anderson........................... 285/174

*Primary Examiner*—Thomas F. Callaghan
*Attorney, Agent, or Firm*—Elliott I. Pollock

[57]    ABSTRACT

An end fitting for a flexible metallic conduit comprises a metal tube having an external thread at one end to enable the tube to be screwed into an end of the conduit, and first and second tubular members embracing the tube and disposed end to end along the tube. The tube has a plurality of projections spaced apart around the tube and disposed between the threaded end of the tube and the other end of the tube, and the second tubular member has a plurality of projections which interengage with the projections on the tube to enable the second tubular member to impart rotary movement to the tube. The second member has an inwardly directed flange which bears against the side of the projections on the tube remote from the threaded end thereof, and the first member is disposed between the flange and said other end of the tube, which end of the tube is turned outwardly captively to mount the first and second members on the tube. The first member is rotatable about the tube and has an external thread to facilitate mounting of the end fitting on a support.

3 Claims, 6 Drawing Figures

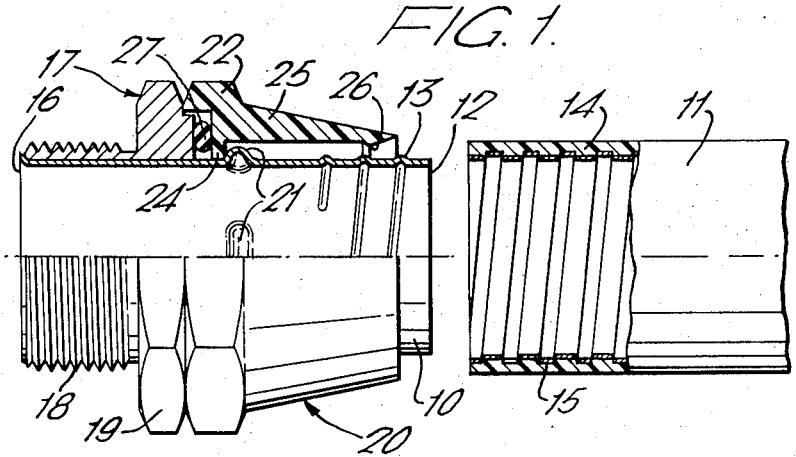
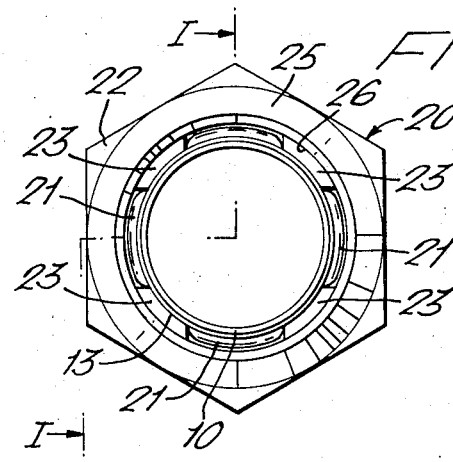
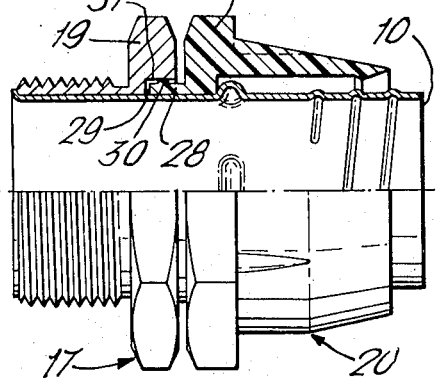

END FITTINGS FOR FLEXIBLE METALLIC CONDUITS

BACKGROUND OF THE INVENTION

This invention relates to end fittings for flexible metallic conduits.

In a well-known form of such an end fitting, the fitting includes a cup-shaped member having a thread to enable the tubular member to be screwed into an end of a flexible metallic conduit, and a tubular, metal member within which the cup-shaped member is mounted. The tubular member has an hexagonal head and two externally threaded, tubular portions extending from opposite ends of the head. The cup-shaped member is mounted within one of the tubular portions by a nut which engages the thread on that tubular portion and urges an annular member of insulating material into engagement with an outer edge of the cup-shaped member to clamp it to the tubular member. The other tubular portion is for use in mounting the end fitting on a metal support. While such an end fitting functions quite satisfactorily, it has been found that difficulty may be experienced in screwing the cup-shaped member into the end of the conduit. It is an object of the present invention to provide an end fitting in which this difficulty is substantially reduced.

SUMMARY OF THE INVENTION

According to the present invention there is provided an end fitting for a flexible metallic conduit, comprising a tubular body member which is externally threaded to enable the body member to be screwed into an end of a flexible metallic conduit to couple the end fitting thereto, and first and second members embracing the tubular member and captively mounted thereon, the first member being rotatably mounted on the body member, and the second member being provided to impart rotary movement to the body member so as to enable the end fitting to be coupled to the flexible metallic conduit by appropriately rotating the second member.

The thread on the body member may be disposed at or adjacent to one end of the body member.

Preferably the second member comprises a sleeve which embraces the threaded end of the body member and which is radially spaced therefrom to define an annular space for receiving an end of the flexible metallic conduit.

The sleeve may have an inwardly directed, annular flange (preferably disposed at an end of the sleeve adjacent the said one end of the body member) for engaging an outer surface of the flexible metallic conduit to provide a liquid-tight seal. Alternatively, the sleeve may have an external thread and the end fitting may include a nut having an internal thread to cooperate with the thread on the sleeve, and the nut may have an inclined surface to engage an inclined surface on an end of the sleeve adjacent said one end of the body member as the nut is screwed on to the sleeve and thereby urge the said end of the sleeve towards the body member.

A liquid-tight seal may be provided between the first and second members. In such a case, this seal may be provided by a sealing ring disposed under pressure between the first and second members. Alternatively, this seal may be provided by an annular projection on one of the first and second members which resiliently engages the other of the first and second members.

Preferably the body member has at least one outwardly extending projection disposed between the thread on the body member and the other end of the body member, and wherein the second member has at least one projection which interengages with the projection on the body member.

The second member may have an inwardly directed flange which bears against the side of the projection on the body member remote from the thread thereof.

The first and second members may be disposed end to end along the body member.

The end of the body member remote from the thread thereof may be turned outwardly captively to mount the first and second members on the body member.

Various forms of end fittings for flexible metallic conduits in accordance with the present invention will now be described, by way of example, with reference to the accompanying drawings in which:

BRIEF DESCRIPTION OF THE DRAWINGS

FIG. 1 is a sectional side elevation, on the line I—I of FIG. 2, of one form of end fitting in accordance with the present invention, together with a sectional side view of an end of a flexible metallic conduit on which the end fitting is to be mounted;

FIG. 2 is an end elevation of the end fitting shown in FIG. 1; and

FIGS. 3 to 6 are side elevations, partly in section, of alternative forms of end fittings in accordance with the present invention.

DESCRIPTION OF THE PREFERRED EMBODIMENTS

Figure 4:
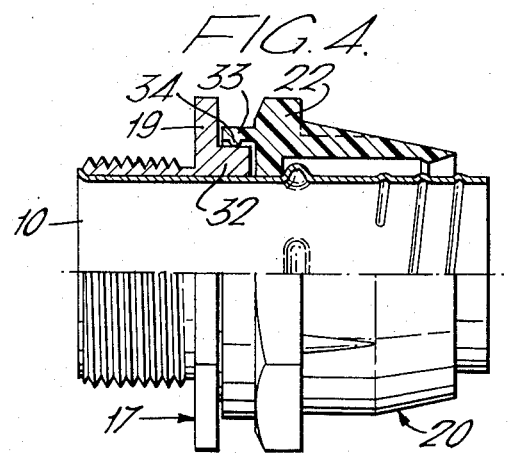

Referring to FIGS. 1 and 2, the end fitting includes a metal tube 10 which is to be screwed into an end of a flexible metallic conduit 11 for carrying electric cables. To this end, the tube 10 is provided at an end 12 with an external screw thread 13. The conduit 11 is of conventional form having an outer sleeve 14 of insulating material and a corrugated, inner flexible tube 15 of metal. The tube 15 is formed by helically winding a longitudinally corrugated metal strip on to a mandrel so that adjacent edges of the strip overlap one another, the overlapping edges having flanges which are folded over to provide a continuous seamed joint.

The tube 10 at its other end 16 is rotatably mounted in a steel ferrule 17 which comprises a sleeve 18 and an hexagonal head 19 at the inner end of the sleeve 18. The sleeve 18 is externally threaded to facilitate mounting of the end fitting on a metal support (not shown). The end 16 is turned outwardly, as indicated in FIG. 1, to retain the ferrule on the tube 10.

The tube 10 also carries a collar 20 of plastics which is provided to impart rotary movement to the tube 10 to enable the tube 10 to be screwed into the conduit 11. More particularly, the tube 10 has a plurality of outwardly extending projections 21 disposed between the portion of the tube 10 carrying the ferrule 17 and the screw thread 13, and spaced apart around the tube 10; and the collar 20 includes an hexagonal head 22 having a plurality of projections 23 (FIG. 2) which extend into the spaces between respective adjacent pairs of the projections 21.

A flange 24 on the head 22 abuts the side of the projections 21 adjacent to the end 16 of the tube 10.

The collar 20 also includes a sleeve 25 which extends towards the tube end 12 and which terminates just short of that end. The sleeve 25 is radially spaced from the tube 10 to provide an annular space between the sleeve 25 and the tube 10 for receiving the end of the conduit 11. The sleeve 25 includes an inwardly-directed, annular projection 26 for resiliently engaging the sleeve 14 of the conduit 11 to provide a liquid-tight seal between the conduit 11 and the sleeve 25. A liquid-tight seal is also provided between the ferrule 17 and the collar 20 by an O-ring seal 27. The liquid-tight seals serve to prevent ingress of moisture into the conduit 11.

The ferrule 17, the collar 20 and the O-ring seal 27 are mounted on the tube 10 by sliding these parts over the tube end 16 before it is deformed. Pressure is then applied to the ferrule 17, so as slightly to deform the O-ring seal 27 and to urge the flange 24 into abutment with the projections 21, and the tube end 16 is then turned outwardly as shown in FIG. 1. The O-ring seal 27 thus acts to urge the threaded end of the sleeve 18 into engagement with the outwardly turned end of the tube 10 so as to enable the tube 15 of the conduit 11 to be grounded to the metal support (not shown) through the tube 10 and the ferrule 17.

In use, the end fitting is mounted on the conduit 11 by offering the threaded end 12 of the tube 10 to the end of the conduit 11 and thereafter by simply rotating the collar 20 in the appropriate direction to bring the thread 13 on the tube 10 into engagement with the convolutions in the tube 15. The end fitting is screwed fully home on the conduit 11 so that the conduit end firmly abuts the projections 21 on the tube 10. This causes the ferrule 17 and the collar 20 to be urged firmly into engagement with one another and in so doing offers a number of advantages. One is that the resultant increased pressure on the O-ring seal 27 improves the seal between the ferrule 17 and the collar 20, and another advantage is that this increased pressure on the seal 27 reduces the likelihood of vibrations causing the end fitting to unscrew from the conduit 11. A still further advantage is that the increased pressure on the O-ring seal increases the pressure with which the ferrule 17 engages the outwardly turned end of the tube 10 to ensure that a good electrical connection is established between the tube 10 and the ferrule 17.

Figure 5:
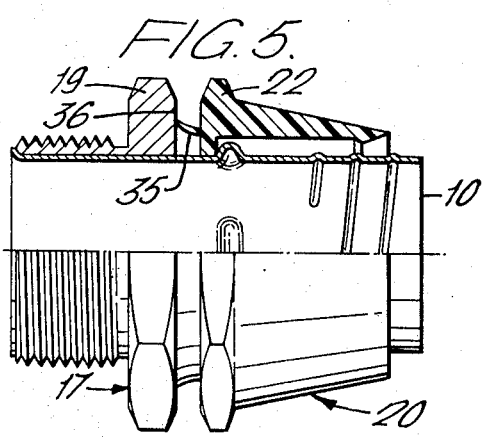

Although in the embodiment of FIGS. 1 and 2, the liquid-tight seal between the ferrule 17 and the collar 20 is constituted by the O-ring seal 27, various other means may be provided to effect this liquid-tight seal. Three such means are shown in FIGS. 3, 4 and 5. In FIG. 3, the head 22 carries a tubular projection 28 which extends into an annular recess 29 formed in the head 19. The tubular projection 28 carries an outwardly-extending, annular flange 30 which resiliently bears against a surface 31 of the head 19 bounding the recess 29 to provide the liquid-tight seal. In the arrangement of FIG. 4, the heads 19 and 22 are provided with tubular projections 32 and 33 respectively which are disposed concentrically with one another with the projection 33 surrounding the projection 32. The liquid-tight seal is provided by an inwardly-extending, annular flange 34 on the projection 33 which resiliently bears against the projection 32. Referring to FIG. 5, the head 22 carries an annular flange 35 which is disposed concentrically with the tube 10 and which resiliently bears against an end surface 36 of the head 19.

Figure 6:
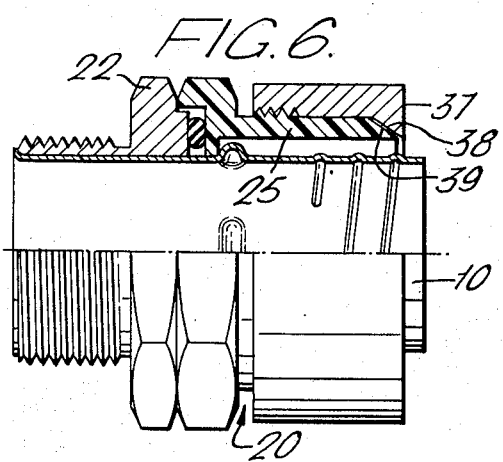

The liquid-tight seal between the sleeve 25 and the flexible metallic conduit 11 may be provided by means other than the annular projection 26. An alternative form of such means is shown in FIG. 6. Referring to FIG. 6, the end fitting includes a nut 37 of metal or plastics which extends round the sleeve 25. The nut 37 and the sleeve 25 have cooperating screw threads and have inclined, end surfaces 38 and 39 respectively which engage one another when the nut 37 is screwed on to the sleeve 25 to cause the end of the sleeve 25 adjacent to the tube end 12 to be deformed inwardly to grip the conduit 11.

Although, in the specific embodiment described, the conduit 11 carries electrical cables, the conduit 11 may also be used to convey liquids.

I claim:

1. An end fitting for a flexible metallic conduit, comprising a tubular metal body which is outwardly flared at one end, said body including an externally screw threaded portion adjacent the other end thereof to enable the tubular body to be screwed into an end of a flexible metallic conduit, a plurality of outwardly extending projections spaced apart around the periphery of said tubular body at a location intermediate said flared end and the said externally screw threaded portion thereof, first and second tubular members coextensively embracing the said tubular body and disposed end to end along the tubular body, the said first tubular member being of metal and externally screw threaded and being rotatably mounted on the said tubular body between its said flared end and its said plurality of outwardly extending projections, and the said second tubular member comprising a sleeve which embraces at least a part of the said external screw threaded portion of said tubular body, said second tubular member including an inwardly directed flange which bears against the side of the said plurality of outwardly extending projections remote from the said screw threaded portion of the tubular body, said second tubular member further including a plurality of inwardly directed projections which interengage with the said outwardly extending projections on the tubular body to enable said tubular body to be screwed into the flexible metallic conduit by appropriately rotating the said second tubular member while maintaining the said first tubular member stationary, and a resilient sealing means positioned between the said first and second tubular members to provide a liquid-tight seal therebetween, said resilient sealing means being stressed to urge the said first tubular member against the said flared end of the tubular body and to urge the said inwardly directed flange of the second tubular member against the side of the said outwardly extending projections on said tubular body.

2. An end fitting according to claim 1, wherein said resilient sealing means is an O-ring.

3. An end fitting for a flexible metallic conduit, comprising a tubular metal body which is outwardly flared at one end, said body including an externally screw threaded portion adjacent the other end thereof to enable the tubular body to be screwed into an end of a flexible metallic conduit, at least one outwardly extending projection on the said tubular body at a location intermediate said flared end and the said externally screw threaded portion thereof, first and second tubular members coextensively embracing the said tubular body, the said first tubular member being of metal, externally screw threaded, and being rotatably mounted on the said tubular body between its said flared end and its said at least one outwardly extending projection, and the said second tubular member comprising a sleeve which embraces at least a part of the said externally screw threaded portion of said tubular body, said second tubular member including inwardly directed flange means positioned to bear against the side of the said at least one outwardly extending projection remote from the said screw threaded portion of the tubular body, said second tubular member further including at least one inwardly directed projection which interengages with the said at least one outwardly extending projection on the tubular body to enable said tubular body to be screwed into the flexible metallic conduit by appropriately rotating the said second tubular member while maintaining the said first tubular member stationary, and a resilient sealing means positioned between the said first and second tubular members to provide a liquid-tight seal therebetween, said resilient sealing means being stressed to exert pressure which urges the said first tubular member against the said flared end of the tubular body and to exert pressure which urges the said inwardly directed flange means of the second tubular member against the side of the said at least one outwardly extending projection on said tubular body.

* * * * *